United States Patent [19]
Ogushi et al.

[11] Patent Number: 5,590,150
[45] Date of Patent: Dec. 31, 1996

[54] ELECTRIC ARC MELTING FURNACE

[75] Inventors: Masaki Ogushi, Yokohama; Osamu Takeuchi, Mitaka; Ikuo Yamamura, Tokyo; Toru Iura, Fujisawa; Hironobu Yoshida, Urayasu, all of Japan

[73] Assignee: Ishikawajima-Harima Jukogyo Kabushiki Kaisha, Tokyo, Japan

[21] Appl. No.: 338,545

[22] PCT Filed: Apr. 14, 1994

[86] PCT No.: PCT/JP94/00619

§ 371 Date: Dec. 9, 1994

§ 102(e) Date: Dec. 9, 1994

[87] PCT Pub. No.: WO95/09336

PCT Pub. Date: Apr. 6, 1994

[30] Foreign Application Priority Data

Sep. 30, 1993 [JP] Japan ................................. 5-244839
Dec. 22, 1993 [JP] Japan ................................. 5-324158

[51] Int. Cl.⁶ .................................................. F27D 17/00
[52] U.S. Cl. ............................................. 373/9; 373/80
[58] Field of Search .......................... 373/8, 9, 60, 77, 373/78, 80, 85, 110, 116, 123, 135, 136

[56] References Cited

U.S. PATENT DOCUMENTS

| | | | |
|---|---|---|---|
| 3,303,257 | 2/1967 | Fujiwara et al. | 373/9 |
| 3,997,711 | 12/1976 | Stark et al. | 373/9 |
| 4,242,532 | 12/1980 | Squibbs | 373/9 |
| 4,347,614 | 8/1982 | Nakamura et al. | 373/77 |
| 4,646,315 | 2/1987 | Hixenbaugh et al. | 373/2 |
| 4,827,486 | 5/1989 | Brotzmann et al. | 373/2 |
| 4,922,505 | 5/1990 | Van Ackeren et al. | 373/9 |
| 5,166,950 | 11/1992 | Jouvaud et al. | 373/2 |

FOREIGN PATENT DOCUMENTS

| | | |
|---|---|---|
| 0183284 | 6/1986 | European Pat. Off. . |
| 0257450 | 3/1988 | European Pat. Off. . |
| 56-47505 | 11/1981 | Japan . |
| 2-24290 | 2/1990 | Japan . |

*Primary Examiner*—Tu Hoang
*Attorney, Agent, or Firm*—Oblon, Spivak, McClelland, Maier & Neustadt, P.C.

[57] ABSTRACT

An electric arc melting furnace comprises a furnace shell (1) with an electrode (3) for melting scrap by heat of arc, an air blasting port (20) for blasting air, oxygen or oxygen-enriched air into the furnace shell (1) through an air control valve (19), a carbon blasted quantity indicator (CI) for measuring quantity of carbon to be charged into the furnace shell (1), a scrap charged quantity indicator (SI) for measuring quantity of the scrap charged into the furnace shell (1), an oxygen blasted quantity indicator (OI) for measuring quantity of oxygen blasted into the furnace shell (1) and an arithmetic processor (7) for computing quantity of air required for complete combustion of carbon monoxide (23) in the furnace shell (1) in response to measured value from the indicators (CI)(SI)(OI) to control a degree of opening of the air control valve (19). Air with quantity in proportion to the carbon monoxide (23) is blasted through the air blasting port (20), which enables control of combustion temperature in the furnace shell (1) and control of temperature in the scrap preheating device.

4 Claims, 6 Drawing Sheets

ELECTRIC ARC MELTING FURNACE

TECHNICAL FIELD

The present invention relates to an electric arc melting furnace for melting scrap to reproduce refined steel.

BACKGROUND ART

In a conventional electric arc melting furnace as shown in FIG. 1 in vertical section, a furnace shell a has a water-cooled roof b at a center of which an electrode c is vertically provided. The furnace shell a has at its bottom an oxygen blasting port d through which oxygen is blasted into the shell a.

The furnace shell a has a spout e at its side. A spout door f outside of the spout e is vertically movable by a door cylinder g such that the spout e is closed and opened by downward and upward moment of the door f, respectively.

The roof b is provided with an exhaust gas duct h which accommodates a conveyer j to charge scrap i into the shell a and which has an air suction port k.

The scrap i is transported together with carboniferous material such as coke by the conveyer j, charged into the shell a and is heated and melted by heat of arc from the electrode c into molten steel 1. The roof b serves to absorb radiant heat from a surface of the molten steel 1.

The oxygen blasted through the port d reacts with the carbon to generate carbon monoxide m which is partially burned with air n intruding into the shell a through the spout e and other gaps. Generally, the quantity of the intruding air n is not sufficient to completely burn all of the carbon monoxide m and therefore about 30–60% of the carbon monoxide m remains unburned and enters into the exhaust duct h in which the carbon monoxide m is re-burned with air from the suction port k. Resultant reaction products to be discharged from the duct h as exhaust gases o preheat the scrap i and carboniferous material transported by the conveyer j into the shell a.

In the conventional electric arc melting furnace shown in FIG. 1 where the carbon monoxide m generated in the shell a is burned with the intruding air n, the quantity of the intruding air n is less as described above and the carbon monoxide m generated is partially burned so that temperature in the shell a is locally increased to generate local heat, disadvantageously resulting in failure of uniform heating of the molten steel 1.

The intruding air n which is relied upon for combustion in the shell a is not controlled at all in relation with the quantity of carbon monoxide m generated in the shell a and the combustion in the shell is left to take its natural course. Therefore, such combustion of the carbon monoxide m cannot be employed for control of temperature in the shell a and, in fact, hardly contributes to any enhancement of thermal efficiency in the shell a depending upon conditions.

Flames are nonuniformly distributed in the shell a due to the partial combustion of the carbon monoxide by the intruding air n so that radiant heat from the surface of the molten steel 1 cannot be effectively absorbed by the water-cooled roof b, disadvantageously resulting in decrease of heat efficiency of the electric arc melting furnace.

The carbon monoxide m, which remains unburned in the shell a in the nonuniform combustion by the intruding air n, is introduced into the duct h with its concentration being left uneven. The introduced carbon monoxide with uneven concentration is nonuniformly or locally burned in the duct h, which may cause the scrap i in the duct h to be nonuniformly preheated or may lead to explosion in the duct h. Preheating temperature of the scrap i cannot be controlled at all.

In view of the above, the present invention has for its object to overcome the above and other defects encountered in the prior art and provide an electric arc melting furnace in which not only combustion temperature in a furnace shell but also preheating temperature in a scrap preheating device are controllable as desired, thereby positively ensuring a high degree of thermal efficiency and safety in furnace operation.

DISCLOSURE OF THE INVENTION

According to the present invention, quantity of carbon monoxide to be generated in the furnace shell is computed by an arithmetic unit based on quantities of carbon, scrap and oxygen charged into the shell so that air whose quantity is controlled by a control valve to be in proportion to the quantity of the carbon monoxide generated is fed through an air blasting pert into the shell. Therefore, the carbon monoxide generated in the shell can be uniformly burned, which improves the thermal efficiency and prevents the carbon monoxide from being introduced into a scrap preheating device.

According to the present invention, deviation in quantity of actually required air due to errors in measurements of the air intruding through gaps in the furnace shell and the carbon, scrap and oxygen to be charged into the furnace may be compensated on the basis of measured values from a combined pressure gage and gas analyzer and a thermometer, so that a quantity of air required for complete combustion of the carbon monoxide generated in the furnace shell can be supplied.

According to the present invention, the air may be blasted tangentially to an upper space in the furnace shell through a plurality of air blasting ports provided through a peripheral wall of the furnace shell so that the carbon monoxide in the shell can be uniformly burned and direct transmission of high-temperature radiant heat from the molten steel to the water-cooled roof is prevented by the combustion in the upper space.

According to the present invention, the air may be blasted to the center of the upper space in the furnace shell through a plurality of air blasting ports provided through the peripheral wall of the furnace shell so that the carbon monoxide in the shell can be uniformly burned and direct transmission of high-temperature radiant heat from the molten steel to the water-cooled roof is prevented by the combustion in the upper space.

According to the present invention, part of the exhaust gases discharged by induction from an upper outlet of the scrap preheating device by an induction fan may be recirculated to the upper space of the shell by a recirculation fan. The exhaust gases whose partially recirculated quantity is adjusted to maintain the temperature in the upper space of the shell to a preset temperature dilute the carbon monoxide in the shell.

According to the present invention, part of the exhaust gases exhausted by the induction fan from the upper output of the scrap preheating device may be blasted into a lower inlet of the scrap preheating device by a recirculation. The exhaust gases whose partially recirculated quantity is adjusted to maintain the temperature in the lower inlet to a preset temperature and whose bypassed flow rate is adjusted to maintain the temperature in the upper outlet to a preset temperature, dilute the carbon monoxide in the shell and control the temperature in the scrap preheating device.

BEST MODES FOR CARRYING OUT THE INVENTION

Embodiments of the present invention will be described in conjunction with the accompanying drawings.

Figure 1:
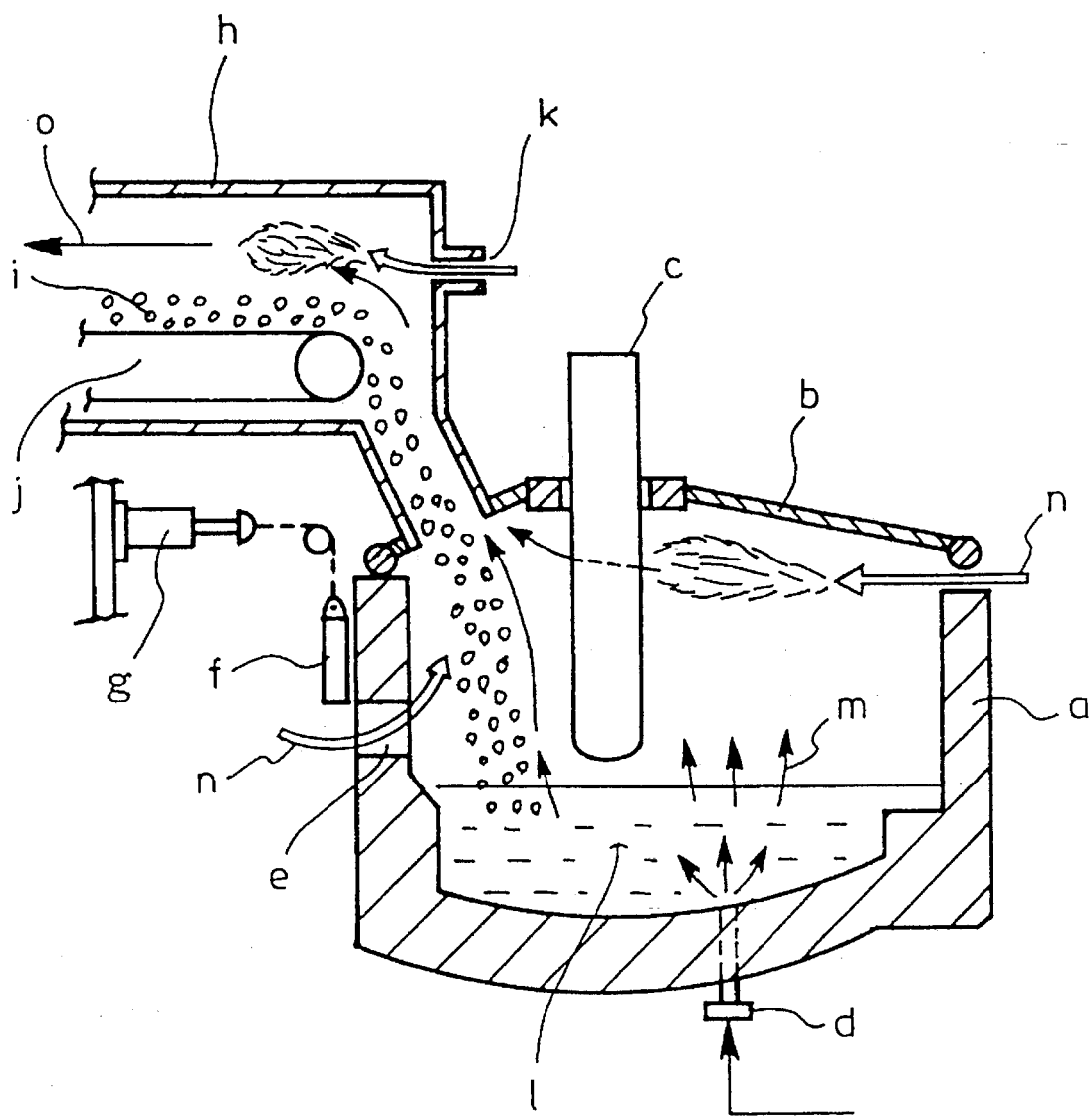
FIG. 1 is a vertical sectional view of a conventional electric arc melting furnace.
Figure 2:
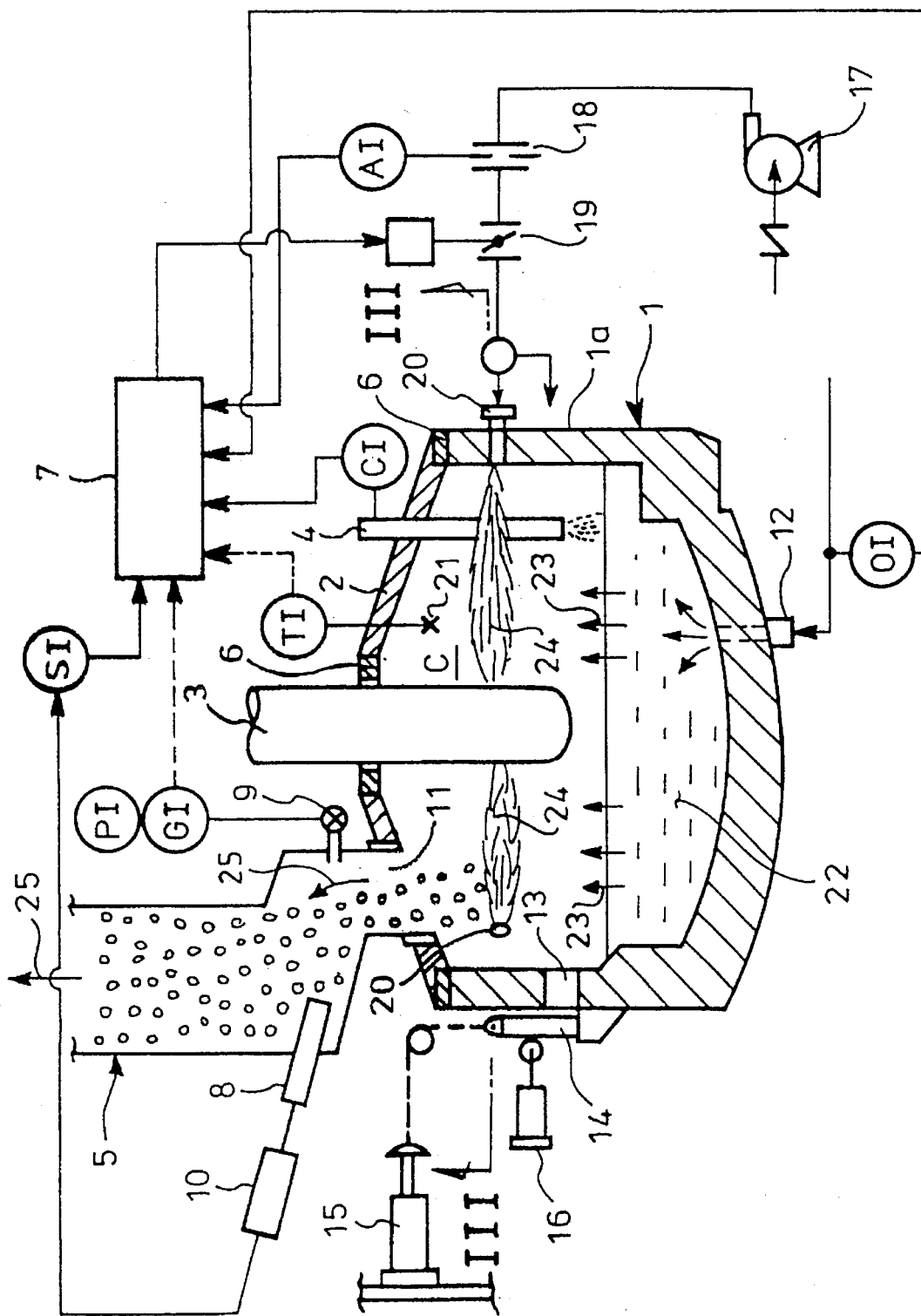
FIG. 2 is a vertical sectional view of embodiments of first and second aspects of the invention.

FIG. 2 is a vertical sectional view of embodiments of first and second aspects of the invention in which a furnace shell 1 has a watercooled roof 2 at a center of which an electrode 3 is vertically provided. The roof 2 has also a carbon blasting port 4 and a scrap preheating device 5 at positions away from the center of the roof 2. Both the roof 2 and the electrode 3 are peripherally surrounded with sealing members 6 to prevent air from intruding into the shell 1.

The carbon blasting port 4 serves to charge into the shell 1 carboniferous material such as coke, graphite or the like after it has been measured by a carbon blasted quantity indicator CI, the measured quantity being inputted as an electric signal into an arithmetic processor 7.

The scrap preheating device 5 is provided with a scrap cutout pusher 8 and a gas exhaust port 11 is provided with a combined pressure gage and gas analyzer 9. The pusher 8 is driven by a scrap cutout drive 10 to charge the scrap into the shell 1 through the port 11. Scrap cutout quantity is measured by a scrap charged quantity indicator SI in response to displacement amount of the drive 10 and is inputted as an electric signal to the arithmetic processor 7. The combined pressure gage and gas analyzer 9 measures gas pressure and quantities of carbon monoxide and oxygen in the scrap preheating device 5 which are inputted as electric signals to the arithmetic processor 7 by pressure and analyzed gas indicators PI and GI.

The furnace shell 1 is provided at its bottom with an oxygen blasting port 12 to blast the oxygen into the shell 1. Quantity of oxygen to be blasted into the shell 1 is measured by an oxygen blasted quantity indicator OI and is inputted as an electric signal into the arithmetic processor 7. In FIG. 2, the oxygen blasting port 12 is shown at the bottom of the shell 1; but it may be opened at an upper side portion of the shell 1.

A thermometer 21 is installed to measure temperature of an upper space C in the shell 1. Temperature measured by the thermometer 21 is inputted from a temperature indicator TI into the arithmetic processor 7.

A spout 13 extends through a side of the shell 1 and a spout door 14 outwardly of the spout 13 is adapted to be vertically moved by a door lifting cylinder 15 such that the door 14 is moved upward and downward to open and close the spout 13, respectively. When the door 14 is moved downward, a door pressing cylinder 16 is actuated to press the door 14 against the shell 1 to prevent the surrounding air from intruding into the shell 1 through the spout 13.

A blower 17 is installed outside of the furnace shell 1. Air, oxygen or oxygen-enriched air is blasted from the blower 17 via an air flowmeter 18 and an air control valve 19 into the upper space C in the shell 1 through an air blasting port 20. A quantity of air blasted into the shell 1 is measured by the air flowmeter 18 and is inputted through an air flow indicator AI into the arithmetic processor 7. The degree of opening of the air control valve 19 is controlled in response to a signal from the arithmetic processor 7.

Figure 3:
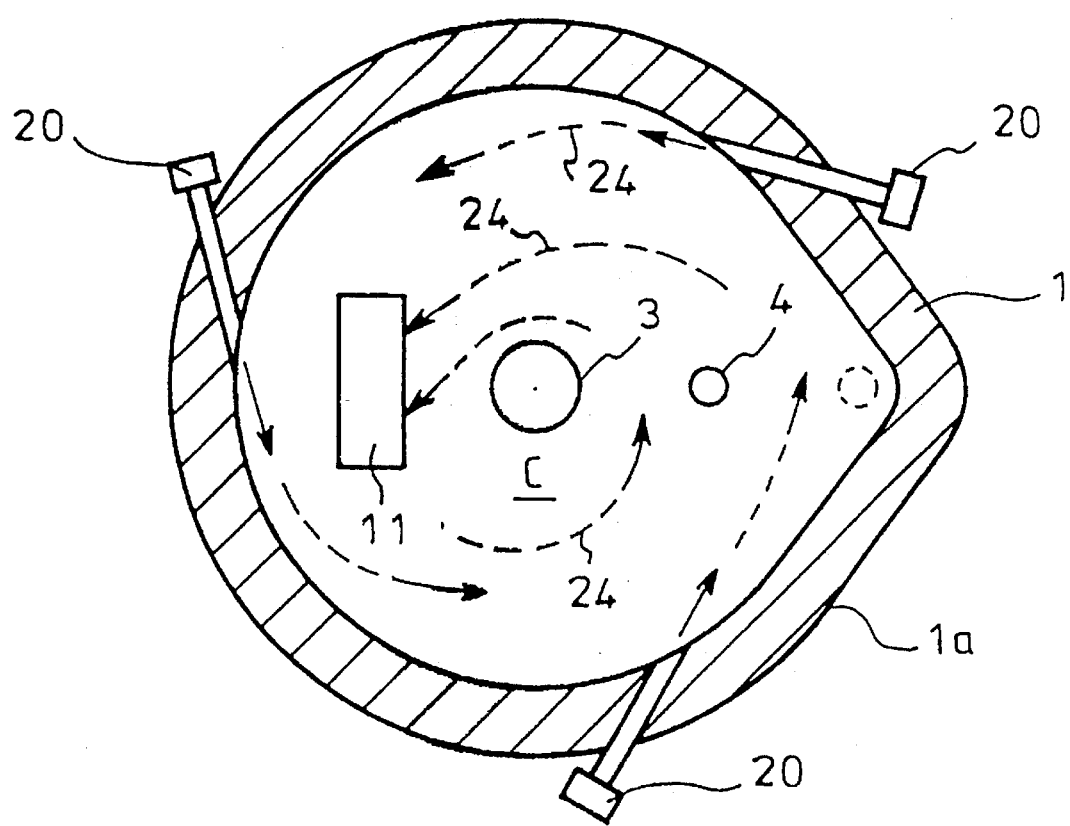
FIG. 3 is a sectional view looking in the direction of arrows III—III in FIG. 2, illustrating an embodiment of a third aspect of the invention.

FIG. 3 illustrates an embodiment of a third aspect of the invention which has at least two air blasting ports 20 extending such that the air is blasted tangentially of a peripheral wall 1a of the furnace shell 1.

Figure 4:
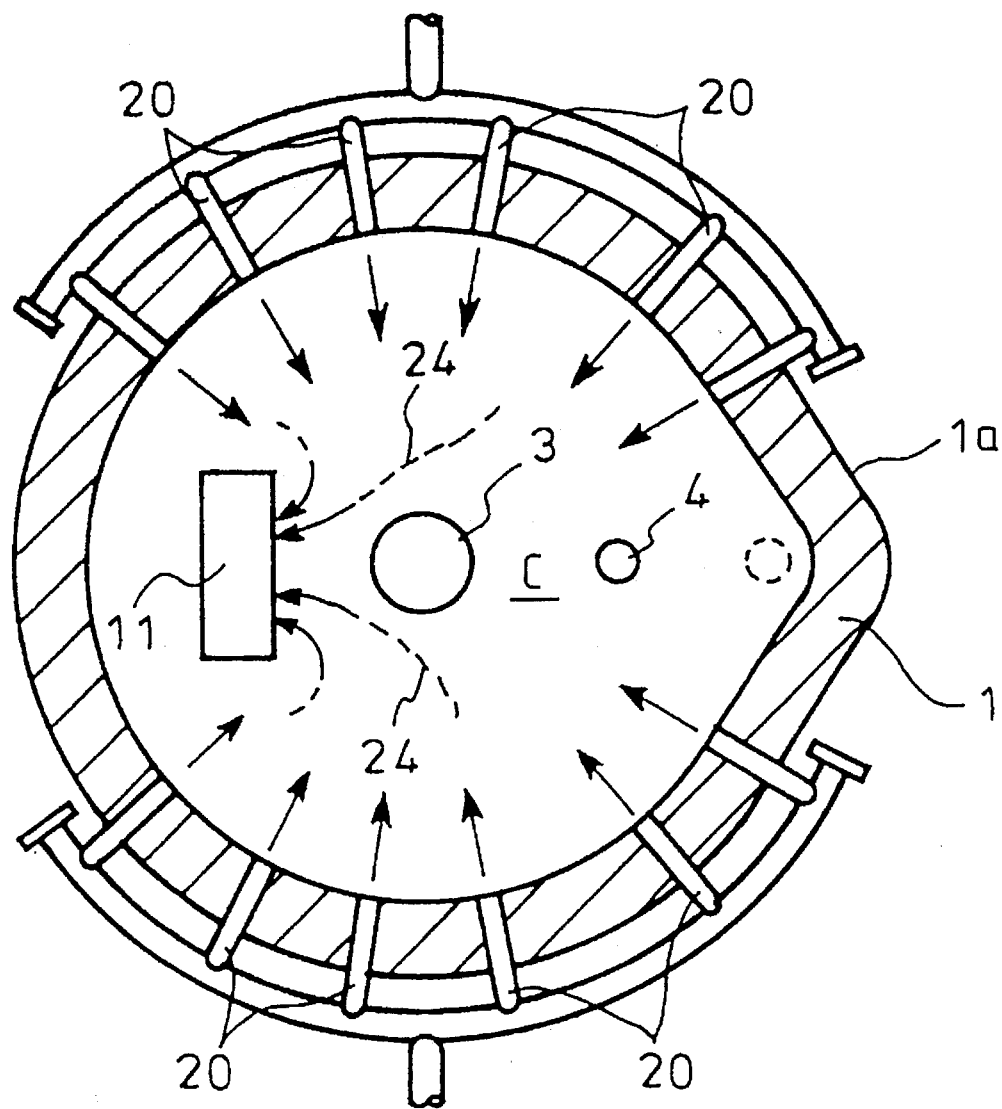
FIG. 4 is a sectional view similar to FIG. 3, illustrating an embodiment of a fourth aspect of the invention.

FIG. 4 illustrates an embodiment of a fourth aspect of the invention which has four or more air blasting ports 20 (4 to 36 ports in the case of larger-sized electric arc melting furnaces) extending such that the air is blasted through the peripheral wall 1a of the furnace shell 1 to the center of the upper space C in the shell 1.

In FIGS. 2 and 3, iron scrap fed to the scrap preheating device 5 is cut out by the pusher 8 through the port 11 into the shell 1 where the scrap is heated and melted by the arc from the electrode 3 into the molten steel 22. Adjustment of carbon content in the molten steel 22 and steel refining are carried out by charging the scrap, blasting the carboniferous material through the carbon blasting port 4 and blasting the oxygen through the oxygen blasting port 12. In this case, carbon in the blasted carboniferous material and in the scrap charged reacts with the blasted oxygen to generate heat and carbon monoxide 23. The heat generated is 2450 kcal per kg of carbon.

In the arrangement shown in FIG. 2, in order to completely burn the generated carbon monoxide 23 which is combustible, the air, oxygen or oxygen-enriched air to be blasted is controlled to a required quantity through passage thereof via the blower 17, the air flowmeter 18 and the air control valve 19 and is blasted into the shell 1 through the air blasting port 20 to produce flames 24. The heat generated in this combustion is 5630 kcal per kg of carbon and is great. In the case of the oxygen or oxygen-enriched air being blasted, temperature of flames can be increased and quantity of gases discharged can be reduced as compared with the case of the air being blasted.

High-temperature exhaust gases after combustion of the carbon monoxide 23 flow through the port 11 into the scrap preheating device 5, preheat iron scrap charged into the preheating device 5 and are discharged out of the furnace as low-temperature exhaust gases 25.

The furnace shell 1 is sealed by the sealing members 6 for elimination of any gaps and the door pressing cylinder 16 is provided for the spout door 14 at the spout 13, thereby minimizing the quantity of the intruding air and providing the closed furnace.

The quantity of the carbon monoxide 23 generated in the furnace shell 1 is therefore dependent upon the quantity of carbon in the molten steel 22 and the quantity of the oxygen blasted.

The quantity of carbon in the molten steel is sum of the carbon blasted quantity from the carbon blasting port 4 measured by the carbon blasted quantity indicator CI, the carbon quantity from the electrode 3 and absorbed into the molten steel 22 and the carbon quantity in the scrap which can be computed on the basis of measurement of the scrap charged quantity indicator SI. When the scrap cutout quantity is inputted from the indicator SI to the arithmetic processor 7, the processor computes the quantity of carbon charged into the molten metal per unit time and the quantity of the oxygen blasted through the oxygen port 12 is inputted as an electric signal from the oxygen blasted quantity indicator OI, whereby quantity of the carbon monoxide 23 generated is computed by calculation on the chemical reaction.

On the basis of the computed quantity of the carbon monoxide the arithmetic processor 7 computes the quantity of the air, oxygen or oxygen-enriched air to be blasted into the shell 1 and delivers an output signal to the air control valve 19, whereby the air, oxygen or oxygen-enriched air with a quantity measured by the air flowmeter 18 is blasted into the furnace shell 1.

The air, oxygen or oxygen-enriched air is blasted through the air blasting port 20 into the furnace shell 1 at 30–100 m/s and absorbs the carbon monoxide 23 evolved from an upper surface of the molten steel 22, thereby burning with flames over the whole inner surface of the furnace shell 1.

Heat radiated by the combustion serves to heat the molten steel 22 and maintain the temperature thereof and the flames 24 substantially reduce heat radiation from the surface of the molten steel 22 to the water-cooled roof 2. The radiant heat from the flames 24 is of course transmitted to the roof 2 and therefore thermal loss from the flames 24 results; however, the thermal transfer loss from the molten steel 22 is prevented. Thus, the carbon monoxide 23 utilized merely partly in the prior art can be fully burned in the furnace shell 1 to enhance the thermal efficiency of the electric arc melting furnaces.

Furthermore, unlike the prior art, re-combustion of the carbon monoxide 23 is not effected in the scrap preheating device 5, resulting in no local heat due to combustion flames. The scrap is efficiently preheated and the preheated temperature, which is conventionally 200° C., reaches 500° C. or more so that the overall thermal efficiency is considerably improved.

In the above-mentioned embodiment, the quantity of the air to be required for complete combustion of the carbon monoxide 23 in the furnace shell 1 is estimatedly computed for control. However, the furnace shell 1 cannot be made completely air-tight and the air may intrude more ore less. In addition, there may exit any erroneous deviations between quantities of carbon, scrap and oxygen actually charged into the shell 1 and the measured quantities thereof.

For compensation of them, inputted into the arithmetic processor 7 are measured values via the gas pressure indicator PI and the analyzed gas indicator GI from the combined gas pressure gage and gas analyzer 9 which effects detection of pressure and gas analyzation of the exhaust gases at the port 11 as well as a measured value from the temperature indicator TI which measures the temperature of the upper space C in the furnace shell 1 so as to obtain a correction signal for computation of the air quantity required for complete combustion of the carbon monoxide 23 in the furnace shell 1. Thus, the quantity of the air, oxygen or oxygen-enriched air to be blasted via the air blasting port 20 into the furnace shell 1 can be controlled for complete combustion of the carbon monoxide 23 generated so that the carbon monoxide 23 generated can be effectively used for melting of the scrap.

In FIG. 3, a plurality of air blasting ports 20 extending through a peripheral wall 1a of the furnace shell 1 blast the air tangentially to the upper space C in the shell 1 so that the carbon monoxide 23 in the shell 1 can be uniformly and effectively burned and direct transmission of high-temperature radiant heat from the molten steel 22 to the water-cooled roof 2 is prevented by the combustion in the upper space C.

In FIG. 4, a plurality of air blasting ports 20 extending through the peripheral wall 1a of the furnace shell 1 blast the air to the center of the upper space C in the shell 1 so that the carbon monoxide 23 in the shell 1 can be uniformly burned and direct transmission of high-temperature radiant heat from the molten steel 22 to the water-cooled roof 2 is prevented by the combustion in the upper space C.

Figure 5:
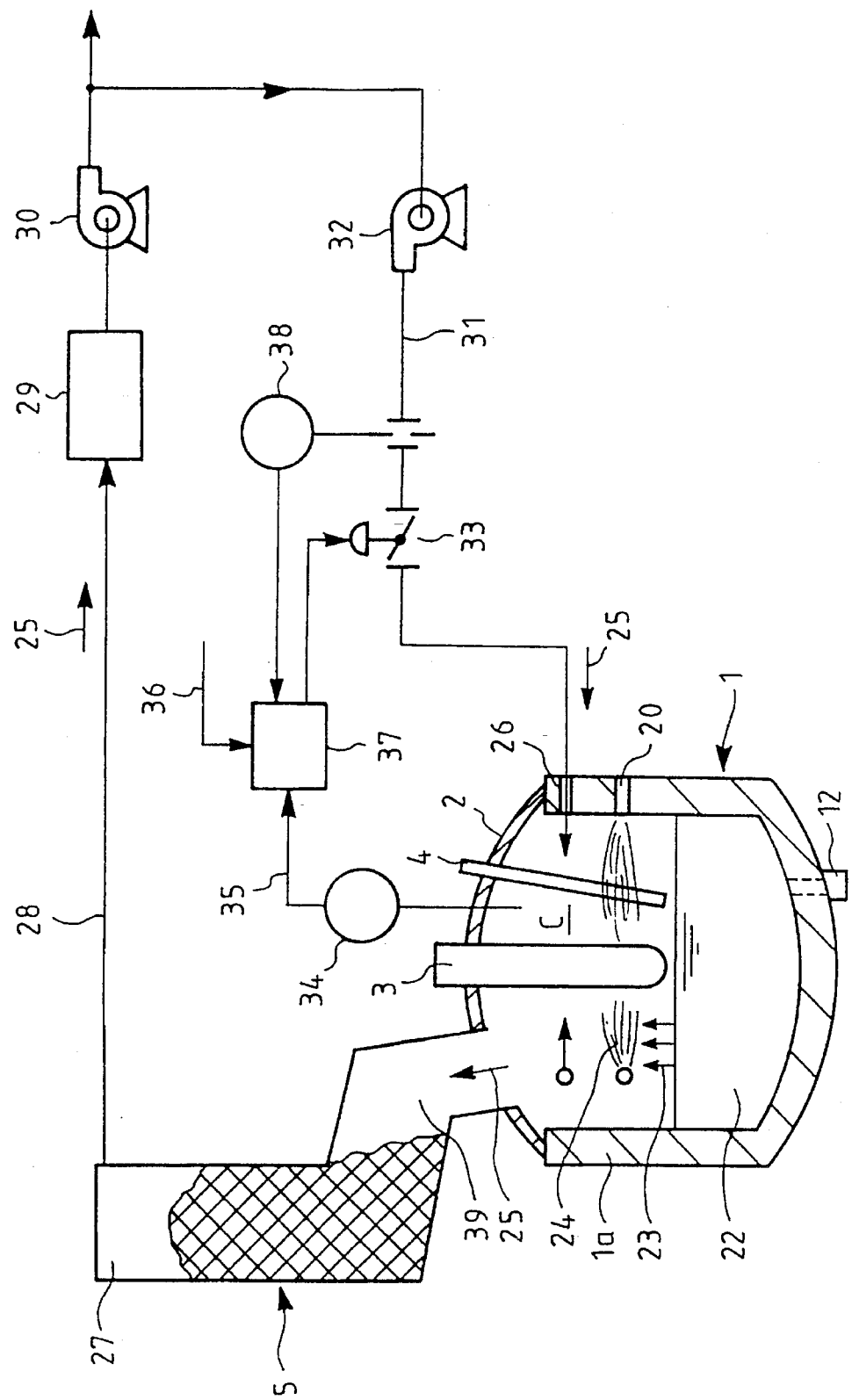
FIG. 5 is a vertical sectional view of an embodiment of a fifth aspect of the invention.

FIG. 5 illustrates an embodiment of a fifth aspect of the invention in which parts same as those in FIG. 2 are denoted by the reference numerals same as those used in FIG. 2.

A discharged gas blasting port 26 extends through the peripheral wall 1a of the furnace shell 1 at an upper portion thereof to open inside the shell 1. The scrap preheating device 5, which is provided above the furnace shell 1 to preheat the scrap to be fed to the shell 1 by the exhaust gases from the shell 1, has an upper outlet 27 which is connected through an exhaust piping 28 and a gas cooler 29 to an induction fan 30.

The induction fan 30 is connected at its outlet side through exhaust gas supply piping 31 to the exhaust gas blasting port 26. A recirculation fan 32 is incorporated in the piping 31 to supply part of the exhaust gases 25 from the outlet side of the induction fan 30 into the upper space C in the furnace shell 1. Furthermore, a flow control damper 33 is disposed at outlet side of the fan 32.

A thermometer 34 is provided to detect a temperature in the upper space C in the furnace shell 1. An upper-space temperature controller 37 is installed into which temperature 35 detected by the thermometer 34 and preset temperature 36 are inputted so as to control the degree of opening of the damper 33 for maintenance of the temperature in the upper space C of the furnace shell 1 to the preset temperature 36. Reference numeral 38 denotes a flowmeter which detects the quantity of the recirculated exhaust gases in the piping 31.

In FIG. 5, the exhaust gases 25 from the upper outlet 27 of the scrap preheating device 5 are cooled by the gas cooler 29 and suctioned by and discharged from the induction fan 30. The exhaust gases 25 at the outlet side of the induction fan 30 are partly recirculated into the upper space C in the shell 1 through the recirculation fan 32 and the exhaust gas supply piping 31. The temperature 25 detected by the thermometer 34, which detects the temperature in the upper space C in the shell 1, is inputted into the upper-space temperature controller 37 to which the preset temperature 36 is also inputted. In view of the detected value from the flowmeter 38, the degree of opening of the flow control damper 33 is controlled to adjust the flow rate of the recirculated exhaust gases 25 so that the detected temperature 35 of the thermometer 34 may be accorded with the preset temperature 36 by the controller 37.

The above-mentioned recirculation of the cooled exhaust gases 25 to the upper space C makes it possible to maintain the temperature in the upper space C to the predetermined temperature 36. Furthermore, the uniform dilution of the carbon monoxide 23 in the furnace shell 1 and the recirculation of the exhaust gases 25 with a low oxygen content prevent adverse problems such as oxidation, nonuniform combustion and explosion in the scrap preheating device 5.

Figure 6:
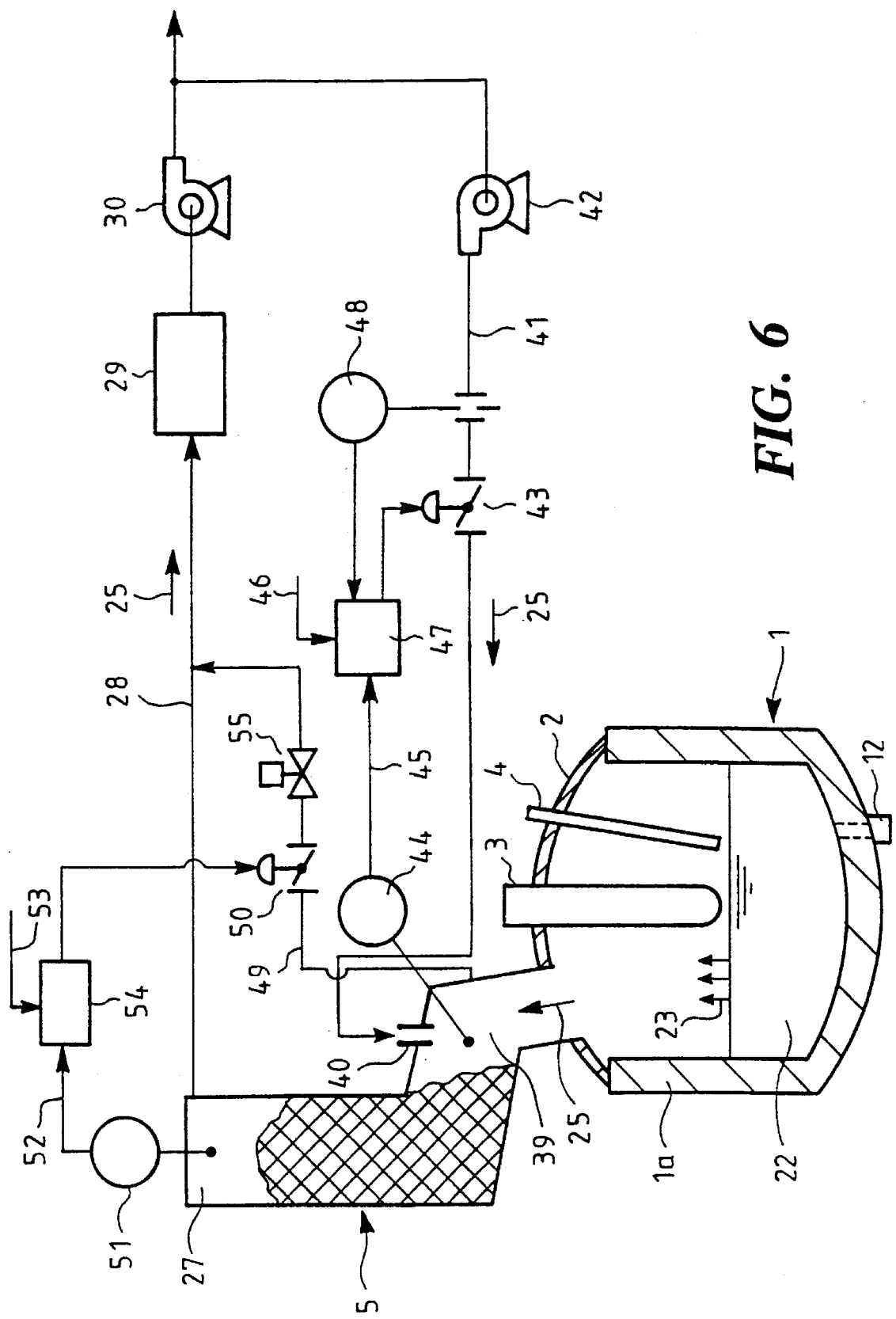
FIG. 6 is a vertical sectional view of an embodiment of a sixth aspect of the invention.

FIG. 6 illustrates an embodiment of a sixth aspect of the invention in which parts same as those in FIGS. 2 and 5 are denoted by the reference numerals same as those used in FIGS. 2 and 5.

The scrap preheating device 5 on the furnace shell 1 has an upper outlet 27 which is connected through exhaust piping 28 and a gas cooler 29 to an induction fan 30. The induction fan 30 is connected at its outlet side through exhaust gas supply piping 41 to an exhaust gas blasting port 40 on a lower inlet 39 of the scrap preheating device 5. A recirculation fan 42 is incorporated in the piping 41 to supply part of the exhaust gases 25 from the outlet side of the induction fan 30 to the lower inlet 39 of the scrap preheating device 5. Furthermore, a flow control damper 43 is disposed at outlet side of the fan 42.

A thermometer 44 is provided to detect a temperature in the lower inlet portion 39 of the scrap preheating device 5. An inlet-portion temperature controller 47 is installed into which temperature 45 detected by the thermometer 44 and preset temperature 46 are inputted so as to control the degree of opening of the damper 43 for maintenance of the temperature in the lower inlet 39 to the preset temperature 46. Reference numeral 48 denotes a flowmeter which detects the quantity of the recirculated exhaust gases in the piping 41.

The lower inlet 39 of the preheating device 5 is connected to the exhaust piping 28 at the outlet side of the upper outlet 27 through bypass piping 49 which has a bypass damper 50. A thermometer 51 is provided to detect a temperature at the upper outlet 27 of the scrap preheating device 5. An outlet temperature controller 54 is installed into which temperature 52 detected by the thermometer 51 and preset temperature 53 are inputted so as to control the degree of opening of the bypass damper 50 for maintenance of the temperature in the upper outlet 39 to the preset temperature 53. Reference numeral 55 denotes a switch damper disposed in the bypass piping 41.

In FIG. 6, the exhaust gases 25 from the upper outlet 27 of the scrap preheating device 5 are cooled by the gas cooler 29 and suctioned by and discharged from the induction fan 30. The exhaust gases 25 at the outlet side of the induction fan 30 are partly recirculated into the lower inlet 39 of the preheating device 5 through the recirculation fan 42 and the exhaust gas supply piping 41. The temperature 45 detected by the thermometer 44, which detects the temperature in the lower inlet 39, is inputted into the inlet temperature controller 47 to which the preset temperature 46 is also inputted. In view of the detected value from the flowmeter 48, the degree of opening of the flow control damper 43 is controlled to adjust the flow rate of the recirculated exhaust gases 25 so that the detected temperature 45 of the thermometer 44 may be accorded with the preset temperature 46 by the controller 47.

The above-mentioned recirculation of the cooled exhaust gases 25 to the lower inlet 39 makes it possible to maintain the temperature in the lower inlet 39 to the predetermined temperature. Furthermore, the discharged gases 25 with a low oxygen content uniformly dilutes the carbon monoxide 23 in the lower inlet 39. These facts prevent adverse problems such as oxidation, nonuniform combustion and explosion in the scrap preheating device 5.

The exhaust gases 25 in the lower inlet 39 of the preheating device 5 are bypassed through the bypass piping 49 and the bypass damper 50 to the downstream side of the upper outlet 27. The detected temperature 52 from the thermometer 51, which detects the temperature of the upper outlet 27, is inputted into outlet temperature controller 54. The degree of opening of the bypass damper 50 is controlled to adjust the bypassed flow rate of the exhaust gases 25.

The exhaust gases 25 partly bypassed through the bypass piping 49 to the downstream side of the upper outlet 27 contributes to controlling the temperature of the upper outlet 27 to a predetermined temperature, which also prevents white smoke and noxious compounds (dioxin) from being generated. Furthermore, the exhaust gases 25 may be bypassed in overfed quantity for preheating of the scrap, which contributes to reducing the pressure loss in the scrap preheating device 5 and compacting the induction fan 30 in size. In the event of troubles such as clogging of the scrap preheating device 5, the exhaust gases 25 may be escaped to the bypass pipe 39 which can therefore also serve as a safety system.

INDUSTRIAL APPLICABILITY

In an electric arc melting furnaces for melting scrap, combustion temperature in the furnace and temperature in the scrap preheating device can be controlled to enhance the thermal efficiency and safety.

We claim:

1. An electric arc melting furnace comprising:
    a furnace shell with an electrode for melting scrap by heat of arc;
    an air blasting port for blasting air oxygen or oxygen-enriched air to an upper space in said furnace shell through an air control valve;
    a carbon blasted quantity indicator for measuring quantity of carbon to be charged into said furnace shell;
    a scrap charged quantity indicator for measuring quantity of the scrap charged into said furnace shell;
    an oxygen blasted quantity indicator for measuring quantity of oxygen blasted into said furnace shell; and
    arithmetic processor for computing quantity of air required for complete combustion of carbon monoxide quantity of which is determined by calculation on chemical reaction from the quantity of carbon in the scrap measured by said scrap charged quantity indicator, from the quantity of carbon measured by said carbon blasted quantity indicator and from the quantity of oxygen measured by said oxygen blasted quantity indicator to control a degree of opening of said air control valve.

2. A furnace according to claim 1 wherein said arithmetic processor for computing quantity of air required for complete combustion of the carbon monoxide in the furnace shell receives as signals for correction measured values from a gas pressure indicator and an analyzed gas indicator for detection of pressure and gas analyzation of the exhaust gases at an exhaust gas port of the furnace shell as well as a measured value from a temperature indicator for measurement of temperature of the upper space in the furnace shell.

3. A furnace according to claim 1 or 2 wherein a plurality of air blasting ports extend through a peripheral wall of said furnace shell such that the air is blasted tangentially to the upper space of said furnace shell.

4. A furnace according to claim 1 or 2 wherein a plurality of air blasting ports extend through a peripheral wall of said furnace shell such that the air is blasted to a center of the upper space in said furnace shell.

* * * * *

UNITED STATES PATENT AND TRADEMARK OFFICE
CERTIFICATE OF CORRECTION

PATENT NO.   :  5,590,150
DATED        :  December 31, 1996
INVENTOR(S)  :  Masaki OGUSHI, et al.

It is certified that error appears in the above-indentified patent and that said Letters Patent is hereby corrected as shown below:

On the title page, Item [87], the PCT information, should read:

--PCT Pub. No.:  WO95/09336
  PCT Pub. Date:  Apr. 6, 1995--

Signed and Sealed this

Fifteenth Day of April, 1997

*Attest:*

BRUCE LEHMAN

*Attesting Officer*      *Commissioner of Patents and Trademarks*